United States Patent
Deitch et al.

(10) Patent No.: US 7,119,144 B2
(45) Date of Patent: Oct. 10, 2006

(54) COMPOSITION, METHOD OF MAKING, AND METHOD OF USING ADHESIVE COMPOSITION

(75) Inventors: Jeffrey Harold Deitch, Crystal Lakes, IL (US); Joseph James Zupancic, Glen Ellyn, IL (US); Mai Chen, Hoffman Estates, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/178,278

(22) Filed: Jun. 24, 2002

(65) Prior Publication Data

US 2003/0083436 A1    May 1, 2003

Related U.S. Application Data

(60) Provisional application No. 60/302,721, filed on Jul. 3, 2001.

(51) Int. Cl.
*B32B 27/00* (2006.01)
*C08L 67/08* (2006.01)

(52) U.S. Cl. ............ 525/10; 428/423.3; 428/500; 525/174

(58) Field of Classification Search ........ 525/425, 525/426, 445, 10, 11, 25
See application file for complete search history.

(56) References Cited

U.S. PATENT DOCUMENTS

| | | | |
|---|---|---|---|
| 3,758,640 A * | 9/1973 | Thorpe | 525/64 |
| 4,076,766 A * | 2/1978 | Simms | 525/166 |
| 4,217,396 A | 8/1980 | Heckles | |
| 4,252,940 A * | 2/1981 | Sublett | 528/301 |
| 4,382,135 A | 5/1983 | Sinka et al. | |
| 4,408,018 A | 10/1983 | Bartman et al. | |
| 4,602,061 A | 7/1986 | Akkerman | |
| 4,644,036 A | 2/1987 | Walz et al. | |
| 4,871,822 A | 10/1989 | Brindopke et al. | |
| 5,017,649 A | 5/1991 | Clemens | |
| 5,084,536 A | 1/1992 | Brindopke et al. | |
| 5,416,136 A | 5/1995 | Konzmann et al. | |
| 5,459,178 A | 10/1995 | Chan et al. | |
| 5,496,896 A | 3/1996 | Alfons | |
| 5,539,017 A | 7/1996 | Rheinberger et al. | |
| 5,945,489 A | 8/1999 | Moy et al. | |
| 6,025,410 A | 2/2000 | Moy et al. | |
| 6,057,001 A | 5/2000 | Schoonderwoerd et al. | |
| 6,203,915 B1 * | 3/2001 | Prissok et al. | 428/423.3 |

FOREIGN PATENT DOCUMENTS

| | | |
|---|---|---|
| EP | 0227454 | 7/1987 |
| WO | W9109910 | 7/1991 |

OTHER PUBLICATIONS

Sheridan, Matthew S., et al., "Novel Resins that Cure Without Added Photoinitiator", Radtech Report, Jul./Aug 2002, pp. 68-75.
R. j. Clemens, F. D. Rector, J. Coatings Technology, 61, No. 770, pp. 83-91 (1989) "A Comparison of Catalysts for Crosslinking Acdtoacetylated Resins via the Michael Reaction".
F. R. Rector, W. W. Blount, D. R. Leonard, J. Coatings Technology, 61, No. 771, pp. 31-37 (1989), "Applications for Acetoacetyl Chemistry in Thermoset Coatings".
J. S. Witzeman, W. D. Nottingham, F. D. Rector, J. Coatings Technology, 62. No. 789, pp. 101-112 (1990), Comparison of Methods for the Preparation of Acetoacetylated Coatings Resins.
N. Pietschmann, K. Stengel, B. Hoesselbarth, Progress Organic Coating, pp. 36 (1-2), 64-49 (1999), "Investigations Into Vinylogic Addition Reactions of Modified Polyester Resins".

* cited by examiner

*Primary Examiner*—Randy Gulakowski
*Assistant Examiner*—Timothy J. Kugel
(74) *Attorney, Agent, or Firm*—Carl P. Hemenway

(57) ABSTRACT

A composition, which is particularly useful as an adhesive, as well as a method of making an adhesive composition, and a method of using an adhesive composition are disclosed.

14 Claims, No Drawings

COMPOSITION, METHOD OF MAKING, AND METHOD OF USING ADHESIVE COMPOSITION

CROSS REFERENCE TO RELATED PATENT APPLICATIONS

This is a non-provisional application of prior pending U.S. provisional application Ser. No. 60/302,721 filed Jul. 3, 2001.

This invention pertains to a composition which is particularly useful as an adhesive, as well as a method of making an adhesive composition, and a method of using an adhesive composition.

Acrylate, methacrylate, and other unsaturated monomers, such as isocyanates, are widely used in coatings, adhesives, sealants and elastomers. These unsaturated monomers are typically low molecular weight multifunctional compounds, which may be volatile or readily absorbed through skin, and can cause adverse health effects. The toxicity of materials like aromatic isocyanates is particularly problematic when used in applications causing concerns for their potential migration into food. Another issue associated with using these compounds is that they require the handler of products containing them to avoid their contact with moisture during handling, such as manufacture, storage and use. Functionalized polymers, which are generally nonvolatile compounds that are not readily absorbed through the skin, may overcome these drawbacks. However, multi-step syntheses may be required, and many of the properties that can be achieved using low molecular weight materials, such as low viscosity, are lost. Therefore the coatings, adhesives, sealants and elastomers industries are continually in need of new systems to manufacture their products which avoid the use of toxic raw materials such as isocyanates, without losing the desirable properties associated with such low molecular weight raw materials.

For example, this has been addressed by U.S. Pat. No. 4,644,036, which discloses a curing component for synthetic resins. The curing component is the product of a Michael addition reaction of a mono- or di-carboxylic acid ester, with a compound selected from the group consisting of polyacrylates, bisacrylamides and urea derivatives, in the presence of a catalyst such as an alkali metal hydroxide, alkali metal alcoholate, and basic amino compounds. Also disclosed is a self-curing synthetic resin on which is chemically bound the above-mentioned curing component. However, a two step process is required to render the synthetic resin useful as a lacquer. In the first step, the curing component (which must be resistant to hydrolysis) is prepared. In the second step, the synthetic resin is crosslinked by the curing component.

Others have been able to accomplish the use of a Michael addition reaction to produce a composition that can be crosslinked to produce a coating or adhesive. U.S. Pat. No. 5,945,489 discloses a liquid oligomeric composition which is the ungelled, uncrosslinked product of a Michael addition reaction of excess di/tri/tetra acrylate acceptor, and an acetoacetate donor, in the presence of an amine based catalyst. U.S. Pat. No. 5,945,410 discloses a method of making the composition of the '489 patent. However, the composition must have equivalent ratios of polyacrylate acceptor:acetoacetate donor of greater than 2:1 where acetoacetate functionality is greater than four, and must have residual pendant unsaturated acrylate groups. Also, to be useful as an adhesive or a coating, an additional step is required, in that the composition must be further crosslinked (cured) by ultraviolet light.

Applicants have found a single step process to produce a composition, particularly useful as an adhesive, without using volatile low molecular weight raw materials but while maintaining the desirable properties associated with such low molecular weight raw materials, by reacting an α,β-unsaturated multi-carboxylic acid ester with a compound (A) having a structural formula

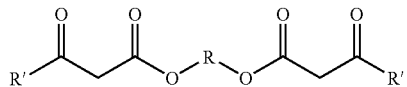

in the presence of a non-amine based catalyst.

In a first aspect of the present invention there is provided a method of making a composition, comprising the step of reacting an α,β-unsaturated multi-carboxylic acid ester with a compound (A) having a structural formula:

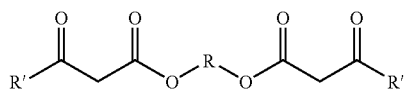

wherein R is a polyester or polyesteramide; wherein $R'$ is $CH_3$, $CH_2CH_3$, $CH_2CH_2CH_3$, or

wherein said reaction is carried out in the presence of at least one non-amine based catalyst; and wherein said composition has a reactive equivalent functionality ratio of α,β-unsaturated multi-carboxylic acid ester to compound (A) of 0.67:1 to 1.75:1.

In a second aspect of the present invention, there is provided a composition comprising a reaction product of an α,β-unsaturated multi-carboxylic acid ester and a compound (A) having a structural formula:

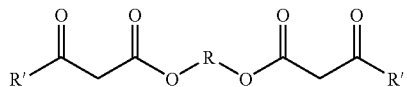

wherein R is a polyester or polyesteramide; wherein $R'$ is $CH_3$, $CH_2CH_3$, $CH_2CH_2CH_3$, or

wherein said reaction is carried out in the presence of at least one non-amine based catalyst; and wherein said composition has a reactive equivalent functionality ratio of α,β-unsaturated multi-carboxylic acid ester to compound (A) of 0.67:1 to 1.75:1.

In a third aspect of the present invention, there is provided a method of adhering a material to a substrate, comprising the step of: applying to a substrate a mixture of an α,β-unsaturated multi-carboxylic acid ester and a compound (A) having the structural formula:

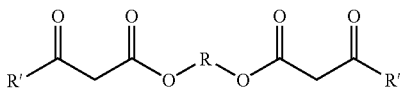

wherein R is a polyester or polyesteramide; wherein $R^I$ is $CH_3$, $CH_2CH_3$, $CH_2CH_2CH_3$, or

;

wherein said reaction is carried out in the presence of at least one non-amine based catalyst; and wherein said composition has a reactive equivalent functionality ratio of α,β-unsaturated multi-carboxylic acid ester to compound (A) of 0.67:1 to 1.75:1.

The method and composition of this invention involves the reaction of an α,β-unsaturated multi-carboxylic acid ester with a compound (A) having the structural formula:

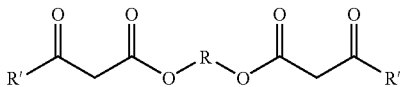

wherein R is a polyester or polyesteramide; wherein $R^I$ is $CH_3$, $CH_2CH_3$, $CH_2CH_2CH_3$, or

;

and wherein said reaction is carried out in the presence of at least one non-amine based catalyst; to produce a composition which is particularly useful as an adhesive. The method produces a composition having a reactive equivalent ratio of α,β-unsaturated multi-carboxylic acid ester to acetoacetate terminated polyester or polyesteramide of 0.67:1 to 1.75:1, preferably 1:1 to 1.5:1, most preferably 1:1 to 1.25:1. At these equivalent ratios, less than one percent of the pendant unsaturated acrylate groups on the composition of the invention remain uncrosslinked at the end of the Michael addition reaction. If ratios above those described above are used, the resulting product is uncrosslinked, ungelled and has several pendant acrylate groups that can further undesirably crosslink by methods other than Michael addition, or adversely impact the performance of the adhesive. Preferably, the composition of the invention is substantially free of solvent. By "substantially free of solvent", herein is meant that the composition contains at least 70% solids, preferably at least 95% solids.

The α,β-unsaturated multi-carboxylic acid ester serves as the curing (crosslinking) agent for compound (A) in the invention. Suitable α,β-unsaturated multi-carboxylic acid esters, which may be polyacrylates, are capable of undergoing a Michael addition reaction. By "polyacrylates", herein is meant di/tri/tetra-acrylates that are based upon hydrocarbons, polyethers, polyesters, epoxides, polyurethanes, polyolefins, and acrylics, and that form homogeneous compatible solutions which do not phase separate upon standing or curing. Examples of suitable polyacrylates include 1,4-butanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, alkoxylated cyclohexane dimethanol diacrylate, propoxylated neopentyl glycol diacrylate, trimethylolpropane triacrylate, ethoxylated trimethylolpropane triacrylate, propoxylated trimethylolpropane triacrylate, acrylated polyester oligomer, bisphenol A diacrylate, ethoxylated bisphenol A diacrylate, tris(2-hydroxyethyl) isocyanurate triacrylate, acrylated aliphatic urethane oligomer, acrylated aromatic urethane oligomer, and the like, and mixtures thereof.

Non-amine based catalysts are used to catalyze the reaction in the invention. Preferably, the catalyst is a strong base. By "non-amine based catalyst" herein is meant, a catalyst which is not based on amine chemistry, and which is capable of causing curing of compound (A) at ambient (typically 20° C. to 25° C.) or supra ambient temperatures (typically 25° C. to 65° C.). Examples of suitable non-amine based catalysts include sodium alkoxides and potassium alkoxides such as sodium methoxide, sodium ethoxide, sodium proproxide, sodium butoxide, potassium methoxide, potassium ethoxide, potassium propoxide, potassium butoxide, quatenary ammonium hydroxides such as tetramethylammonium hydroxide, tetraethylammonium hydroxide, tetrabutylammonium hydroxide, tetraoctylammoniium hydroxide, sodium acetylacetonates and potassium acetylacetonates, such as sodium acetylacetonate, potassium acetylacetonate, and the like, and mixtures thereof.

Compound (A) may be an acetoacetate terminated polyester or polyesteramide. Preferably, the acetoacetate terminated polyester or polyesteramide used contributes to hydrogen bonding and/or polar interactions. The acetoacetate terminated polyester or polyesteramide contains multi-carboxylic acids, of which 5 to 80 mole percent may be at least one aromatic multi-carboxylic acid. The acetoacetate terminated polyester may be prepared by conventional means, which are readily available to those skilled in the art. For example, one may use a two step process where the first step involves condensing glycols selected from the group including diols and triols, with carboxylic acids selected from the group including di/tri-carboxylic acids, to produce a polyester terminated with hydroxyl radicals, and having a hydroxyl value of 50 to 225, and an acid value of 0.1 to 5, preferably 0.1 to 2, more preferably 0.1 to 1. The second step involves converting the hydroxyl radicals into acetoacetate radicals by reaction with a modifying reagent, to form the acetoacetate terminated polyester. By "modifying reagent" herein is meant, a compound which causes modification of the hydroxyl terminated polyester by converting the hydroxyl radicals to acetoacetyl radicals. Examples of suitable modifying reagents include methyl acetoacetate, ethyl acetoacetate, isopropyl acetoacetate, isobutyl acetoacetate, t-butyl acetoacetate, diketene, 2,2,6-trimethyl-4H-1,3-dioxin-4-one, ethyl benzoylacetate, and the like, and mixtures thereof. The acetoacetate terminated polyester may contain up to 10 weight percent (based on polyester) of urethane radicals, which are created by modifying the hydroxyl terminated polyester by reacting it with a diisocyanate. Suitable diisocyanates include 4,4'-diphenylmethane diisocyanate, 4,2'-diphenylmethane diisocyanate, toluene diisocyanate, hexamethylene diisocyanate, isophorone diisocyanate, tetramethylxylene diisocyanate, and the like, and combinations thereof. Preferably, the acetoacetate terminated polyester contains no isocyanates. Preferably, the acetoacetate terminated polyester contains 1.6 to 3 acetoacetate groups per chain, more preferably 1.7 to 2.5 acetoacetate groups per chain, most preferably 2 to 2.5 acetoacetate groups per chain. The acetoacetate terminated polyester has a weight average molecular weight (measured by gel permeation chromatography) of 1,200 to 10,000, preferably 1,200 to 5,000, most preferably 1,800–4,000. Generally, the first step takes place at temperatures of 100° C. to 240° C., and the second step at temperatures of 80° C. to 150° C. Preferably, the two step process takes place in the presence of a catalyst. Preferably, the catalyst is selected from the group consisting of dibutyltin oxide, hydroxybutyltin oxide, monobutyltin tris(2-ethylhexoate), tetraethyl titanate, tetrapropyl titanate, tetra(isopropyl) titanate, tetrabutyl titanate, tetra(2-ethylhexyl) titanate, titanium acetylacetonate, ethyl acetoacetic ester titanate, butyl zirconate, and propyl zirconate, and the like, and combinations thereof. Examples of suitable polyesters include those based on ethylene glycol, propylene glycol, 1,4-butanediol, diethylene glycol, 1,6-hexanediol, neopentyl glycol, 2-methyl-1,3-propanediol, triethylene glycol, 1,4-cyclohexanedimethanol, trimethylolpropane, trimethylolethane, pentaerythritol, glycerin, etc. condensed with adipic acid, azelaic acid, sebacic acid, malonic acid, fumaric acid, maleic acid, maleic anhydride, 1,4-cyclohexanedicarboxylic acid, phthalic anhdyride, isophthalic acid, terephthalic acid, 2,6-naphthalenedicarboxylic acid, trimellitic acid, caprolactone, malic acid, dimethylolpropionic acid, succinic anhydride, and the like, and mixtures thereof.

The acetoacetate terminated polyesteramide is prepared by conventional means, which are readily available to those skilled in the art. For example, one may use a two step process where the first step involves condensing glycols selected from the group including diols and/or triols, and amino alcohols, with carboxylic acids selected from the group including di/tri-carboxylic acids, to produce a polyesteramide terminated with hydroxyl radicals, and having a hydroxyl value of 50 to 225, and an acid value of 0.1 to 5, preferably less than 0.1 to 2, more preferably 0.1 to 1. During the second step, converting the hydroxyl radicals into acetoacetate radicals by reaction with a modifying reagent, to form the acetoacetate terminated polyesteramide. By "modifying reagent" herein is meant, a compound which causes modification of the hydroxyl terminated polyesteramide by converting the hydroxyl radicals to acetoacetyl radicals. Examples of suitable modifying reagents include methyl acetoacetate, ethyl acetoacetate, isopropyl acetoacetate, isobutyl acetoacetate, t-butyl acetoacetate, diketene, 2,2,6-trimethyl-4H-1,3-dioxin-4-one, and the like, and mixtures thereof. The acetoacetate terminated polyesteramide may contain up to 10 weight percent (based on polyesteramide) of urethane radicals, which are created by modifying the hydroxyl terminated polyesteramide by reacting it with a diisocyanate. Suitable diisocyanates include 4,4'-diphenylmethane diisocyanate, 4,2'-diphenylmethane diisocyanate, toluene diisocyanate, hexamethylene diisocyanate, isophorone diisocyanate, tetramethylxylene diisocyanate, and the like, and combinations thereof. Preferably, the acetoacetate terminated polyesteramide contains no isocyanates. Preferably, the acetoacetate terminated polyesteramide contains 1.6 to 3 acetoacetate groups per chain, more preferably 1.7 to 2.5 acetoacetate groups per chain, most preferably 2 to 2.5 acetoacetate groups per chain. The acetoacetate terminated polyester has a weight average molecular weight (measured by gel permeation chromatography) of 1,200 to 10,000, preferably 1,200 to 5,000, most preferably 1,800–4,000. Generally, the first step takes place at temperatures of 100° C. to 240° C., and the second step at temperatures of 80° C. to 150° C. Preferably, the two step process takes place in the presence of a catalyst. Preferably, the catalyst is selected from the group consisting of dibutyltin oxide, hydroxybutyltin oxide, monobutyltin tris(2-ethylhexoate), tetraethyl titanate, tetrapropyl titanate, tetra(isopropyl)titanate, tetrabutyl titanate, tetra(2-ethylhexyl) titanate, titanium acetylacetonate, ethyl acetoacetic ester titanate, butyl zirconate, and propyl zirconate, and the like, and combinations thereof. Examples of suitable polyesteramides include those based on diols and/or triols such as ethylene glycol, propylene glycol, 1,4-butanediol, diethylene glycol, 1,6-hexanediol, neopentyl glycol, 2-methyl-1,3-propanediol, triethylene glycol, 1,4-cyclohexanedimethanol, trimethylolpropane, trimethylolethane, pentaerythritol, glycerin, and the like, and mixtures thereof; and amino alcohols such as ethanolamine, 2-amino-2-methyl-1-propanol, 3-amino-1-propanol, 1-amino-2-propanol, 2-amino-1-butanol, 4-amino-1-butanol, 2-amino-1,3-propanediol, 3-amino-1,2-propanediol, 2-amino-2-methyl-1,3-propanediol, 2-amino-2-ethyl-1,3-propanediol, and the like, and mixtures thereof; condensed with dicarboxylic acids, tricarboxylic acids and/or hydroxy carboxylic acids such as adipic acid, azelaic acid, sebacic acid, malonic acid, fumaric acid, maleic acid, maleic anhydride, 1,4-cyclohexanedicarboxylic acid, phthalic anhdyride, isophthalic acid, terephthalic acid, 2,6-naphthalenedicarboxylic acid, trimellitic acid, caprolactone, malic acid, dimethylolpropionic acid, succinic anhydride and the like, and mixtures thereof.

Another embodiment of the invention is the method of using the composition of the invention to adhere a material to a substrate. The $\alpha,\beta$-unsaturated multi-carboxylic acid ester, and compound (A) may be employed as a two part system, wherein one part is the the $\alpha,\beta$-unsaturated multi-carboxylic acid ester, and the other part is compound (A). The catalyst may be present in either or both parts. Preferably, the two parts are mixed together, in the presence of a catalyst, prior to application to a substrate. The composition of the invention typically has a potlife of five minutes to eight hours, depending upon the components, catalyst level and temperature. Preferably, the composition has a minimum potlife of 5 to 10 minutes at 50° C. By "potlife" herein is meant, the period of time during which the composition remains uncured, and can thus be applied to a substrate for adhesion. The composition is then applied to the substrate. The method of application may be by a number of ways known to those having ordinary skill in the art (for example brushing, spraying, roller coating, rotogravure coating, flexographic coating, flow coating, dipping and combinations thereof) to form a continuous or discontinuous film of the composition, as desired. The composition may be applied at a level of 0.4 to 5.8 g/sq. meter.

After the composition has been applied to the first substrate, it may then be contacted with another substrate to provide a laminate construction. The laminate so formed is optionally subjected to applied pressure, such as passing it between rollers to effect increased contact of the substrates with the composition. In another embodiment of the invention, the composition may be simultaneously or sequentially applied to both surfaces of the first substrate, which composition are then simultaneously or sequentially bonded to two further substrates, which may be the same, or different. It is further contemplated that the laminate construction may sequentially be bonded to other substrate(s) using the composition of the invention, or a different composition before or after the process described herein. The first and second substrates to be bonded in the method of this invention may be the same or different and include, for example plastics, metallized plastics, metal, and paper, which may have smooth or structured surfaces and may be provided in the form of rolls, sheets, films, foils etc. The substrates may be constructed in multi-ply laminate structures based upon polyalkylenes, such as polyethylenes, and polypropylenes, polyesters, and polyamides (nylon), metallized polypropylene, aluminum foil, etc. Examples of two-ply laminate constructions, include polypropylene/polypropylene, polyester/nylon, polyester/polyethylene, polypropylene/metallized polypropylene, polypropylene/aluminum foil, polyester/aluminum foil, polyamide/aluminum foil, etc. A temperature above ambient is not necessary to dry and cure the composition disclosed herein, however, heat may be applied.

While the invention is particularly useful as an adhesive, it is contemplated that it is also applicable to coatings, sealants and elastomers.

All ranges disclosed herein are inclusive, and the minimums and maximums of the nested ranges are combinable.

EXAMPLES 1–8

Synthesis of Acetoacetate Terminated Polyester

Glycol(s), carboxylic acid(s), and Fascat 4100, were charged to a 1-Liter one-piece reactor and slowly heated to 100° C. The reaction temperature was slowly increased to 200° C. When water evolution stopped, the temperature was decreased to 175° C. and vacuum applied. The reaction was maintained at 175° C. and ca. 3 mm of vacuum until the Acid Value (AV) was less than 1.0. The reaction temperature was decreased to 120° C., and then ethyl acetoacetate was added gradually over a 1 hr. interval. The reaction temperature was increased to 150° C., and maintained until ethanol evolution ceased. While maintaining the reaction at 150° C., vacuum was applied and residual ethanol and ethyl acetoacetate were removed.

TABLE 1

Raw Material For Synthesis of Acetoacetate Terminated Polyester

| Example | Glycol (g) | | | | | Carboxylic Acid (g) | | Other (g) | | Total Charge (g) |
| --- | --- | --- | --- | --- | --- | --- | --- | --- | --- | --- |
| | Diethylene Glycol | Trimethylolpropane | Neopentyl Glycol | Methyl Propane Diol | 1,6-Hexanediol | Adipic Acid | Isophthalic Acid | Fascat 4100 | Ethyl Acetoacetate | |
| C1 | 314.84 | | | | | 376.08 | | 1.45 | 97.16 | 789.53 |
| C2 | 317.30 | | | | | 217.85 | 121.94 | 1.15 | 184.60 | 842.84 |
| 3 | 287.04 | 43.55 | | | | 257.47 | 144.78 | 0.66 | 148.05 | 881.55 |
| 4 | | 43.56 | 279.92 | | | 384.45 | | 0.70 | 138.00 | 846.63 |
| 5 | 286.65 | 43.75 | | | | 384.30 | | 0.87 | 139.22 | 854.79 |
| 6 | | 43.60 | | 248.74 | | 385.02 | | 0.73 | 157.17 | 835.26 |
| 7 | | 162.15 | 140.93 | | 43.60 | 371.61 | | 0.81 | 167.35 | 886.45 |
| 8 | | 43.70 | | 246.55 | | 231.95 | 126.93 | 0.86 | 223.23 | 873.22 |

NOTE: C1 and C2 are comparative examples. Fascat 4100 is made by Elf Atochem North America, Inc., located in Philadelphia, PA.

TABLE 2

Synthesized Acetoacetate Terminated Polyester

| Example | Polyester Prior to Acetoacetylation | | Final Acetoacetate Terminated Polyester | | | | | | |
| --- | --- | --- | --- | --- | --- | --- | --- | --- | --- |
| | Acid Value | Hydroxyl Value | ASTM Solids (%) | Brookfield Viscosity (cps) | Molecular Weight | | Dispersity (Mw/Mn) | Acetoacetate Groups/Polyester Chain |
| | | | | | Mn | Mw | | |
| C1 | 0.92 | 74.7 | 99.14 | 1930 | 1600 | 5200 | 3.25 | 0.92 |
| C2 | 0.20 | 135.2 | 97.59 | 644.7 | 650 | 1300 | 2.0 | 1.14 |
| 3 | 0.3 | 90.3 | 99.67 | 10720 | 1200 | 5350 | 4.5 | 1.87 |
| 4 | 0.4 | 100.62 | 98.89 | 6680 | 2600 | 8000 | 3.1 | 2.41 |
| 5 | 0.19 | 89.09 | 99.17 | 3843 | 1400 | 6200 | 4.4 | 1.82 |
| 6 | 0.2 | 99.2 | 99.50 | 13480 | 2800 | 9850 | 3.5 | 1.71 |
| 7 | 0.3 | 85.3 | 99.40 | 4480 | 1700 | 5950 | 3.47 | 2.20 |
| 8 | 0.6 | 157.6 | 99.03 | 10153 | 1200 | 3200 | 2.77 | 1.96 |

NOTE: C1 and C2 are comparative examples.

EXAMPLES 9–13

Synthesis of Acetoacetate Terminated Polyesteramide

Glycol(s), carboxylic acid(s), amino alcohol, and Fascat 4100, were charged to a 1-Liter one-piece reactor and slowly heated to 100° C. The reaction temperature was slowly increased to 200° C. When water evolution stopped, the temperature was decreased to 175° C. and vacuum applied. The reaction was maintained at 175° C. and ca. 3 mm of vacuum until the Acid Value (AV) was less than 1.0. The reaction temperature was decreased to 120° C., and then ethyl acetoacetate was added gradually over a 1 hr. interval. The reaction temperature was increased to 150° C., and maintained until ethanol evolution ceased. While maintaining the reaction at 150° C., vacuum was applied and residual ethanol and ethyl acetoacetate were removed.

TABLE 3

Raw Material For Synthesis of Acetoacetate Terminated Polyesteramide

| Example | Glycol (g) | | | | Amino Alcohol (g) | Carboxylic Acid (g) | | Other (g) | | Total Charge (g) |
| | Diethylene Glycol | Tri-methylol-propane | Neo-pentyl Glycol | Methyl Propane Diol | Ethanol-amine | Adipic Acid | Isophthalic Acid | Fascat 4100 | Ethyl Aceto-acetate | |
| --- | --- | --- | --- | --- | --- | --- | --- | --- | --- | --- |
| 9 | 232.08 | 43.60 | | | 30.68 | 258.10 | 144.92 | 0.75 | 148.38 | 858.51 |
| 10 | | 43.68 | | 202.40 | 31.41 | 384.88 | | 0.81 | 155.00 | 818.18 |
| 11 | | 43.60 | 238.16 | | 31.03 | 385.05 | | 0.81 | 162.70 | 861.35 |
| 12 | | 43.81 | | 203.74 | 36.20 | 234.34 | 128.20 | 0.98 | 220.52 | 867.79 |
| 13 | | 43.70 | | 201.44 | 30.52 | 350.19 | | 0.97 | 217.68 | 844.50 |

NOTE: Fascat 4100 is made by Elf Atochem North America, Inc., located in Philadelphia, PA.

TABLE 4

Synthesized Acetoacetate Terminated Polyesteramide

| | Polyesteramide Prior to Acetoacetylation | | Final Acetoacetate Terminated Polyesteramide | | | | | |
| Example | Acid Value | Hydroxyl Value | ASTM Solids (%) | Brookfield Viscosity (cps) | Molecular Weight | | Dispersity (Mw/Mn) | Acetoacetate Groups/Polyester-amide Chain |
| | | | | | Mn | Mw | | |
| --- | --- | --- | --- | --- | --- | --- | --- | --- |
| 9 | 1.1 | 85.4 | 99.47 | 42400 | 3300 | 8900 | 2.7 | 1.80 |
| 10 | 0.8 | 96.8 | 99.52 | 22933 | 4300 | 12200 | 2.8 | 1.92 |
| 11 | 1.2 | 64.2 | 99.80 | 169600 | 5100 | 26000 | 5.1 | 2.94 |
| 12 | 1.2 | 162.2 | 99.23 | 41117 | 1100 | 3100 | 2.78 | 1.80 |
| 13 | 0.94 | 140.94 | 99.50 | 7787 | 1350 | 4600 | 3.4 | 2.06 |

EXAMPLES 14–37

Application Testing of Composition of the Invention

The polyester or polyesteramide (Part I) was mixed with a polyacrylate and ethanol (Part II) and a catalyst (21% sodium ethoxide in ethanol). The composition was coated onto a plastic film with a number 3 rod and laminated to a second laminate film with a nip temperature of 150° F. The peel strength of the laminates were determined after 1 day and 7 days at ambient temperature.

TABLE 5

Materials Used in Application Testing of Composition Made by Reaction of Acetoacetate Terminated Polyester with Polyacrylate

| Example | Part I (g) | | | | | | Part II (g) | |
| | Acetoacetate Terminated Polyester 1 | Acetoacetate Terminated Polyester 2 | Acetoacetate Terminated Polyester 3 | Acetoacetate Terminated Polyester 4 | Acetoacetate Terminated Polyester 7 | Acetoacetate Terminated Polyester 8 | SR259 (Diacrylate of Polyethylene Glycol 200) | MorCure 2000 (Diacrylate of Diglycidyl Ether Bisphenol-A) |
| --- | --- | --- | --- | --- | --- | --- | --- | --- |
| C14 | 11.67 | | | | | | 4.92 | |
| C14a | 11.67 | | | | | | 4.92 | |
| C14b | 11.67 | | | | | | 4.92 | |
| C15 | | 10.07 | | | | | 2.45 | |
| C15a | | 10.07 | | | | | 2.45 | |
| C15b | | 10.07 | | | | | 2.45 | |
| 16 | | | 5.05 | | | | 1.28 | |
| 16a | | | 5.05 | | | | 1.28 | |
| 16b | | | 5.05 | | | | 1.28 | |
| 17 | | | 5.23 | | | | 1.33 | 0.70 |
| 17a | | | 5.23 | | | | 1.33 | 0.70 |
| 17b | | | 5.23 | | | | 1.33 | 0.70 |
| 18 | | | | 5.11 | | | 1.44 | |
| 18a | | | | 5.11 | | | 1.44 | |
| 18b | | | | 5.11 | | | 1.44 | |
| 19 | | | | 5.18 | | | 1.44 | |
| 19a | | | | 5.18 | | | 1.44 | |

TABLE 5-continued

Materials Used in Application Testing of Composition Made by Reaction of Acetoacetate Terminated Polyester with Polyacrylate

| | | | | | | |
|---|---|---|---|---|---|---|
| 19b | 5.18 | | | | 1.44 | |
| 20 | 5.16 | | | | 1.45 | |
| 20a | 5.16 | | | | 1.45 | |
| 20b | 5.16 | | | | 1.45 | |
| 21 | | 5.09 | | | 1.65 | |
| 21a | | 5.09 | | | 1.65 | |
| 21b | | 5.09 | | | 1.65 | |
| 22 | | 5.14 | | | 1.34 | 0.70 |
| 22a | | 5.14 | | | 1.34 | 0.70 |
| 22b | | 5.14 | | | 1.34 | 0.70 |
| 23 | | | 5.06 | | 1.83 | |
| 23a | | | 5.06 | | 1.83 | |
| 23b | | | 5.06 | | 1.83 | |
| 24 | | | 5.82 | | 1.54 | 0.82 |
| 24a | | | 5.82 | | 1.54 | 0.82 |
| 24b | | | 5.82 | | 1.54 | 0.82 |
| 25 | | | | 7.63 | 4.01 | |
| 25a | | | | 7.63 | 4.01 | |
| 25b | | | | 7.63 | 4.01 | |
| 26 | | | | 7.56 | 3.18 | 1.67 |
| 26a | | | | 7.56 | 3.18 | 1.67 |
| 26b | | | | 7.56 | 3.18 | 1.67 |
| 27 | | | | 7.69 | 2.41 | 3.31 |
| 27a | | | | 7.69 | 2.41 | 3.31 |
| 27b | | | | 7.69 | 2.41 | 3.31 |
| 28 | | | | 5.02 | 1.90 | |
| 28a | | | | 5.02 | 1.90 | |
| 28b | | | | 5.02 | 1.90 | |
| 29 | | | | 5.07 | 1.53 | 0.79 |
| 29a | | | | 5.07 | 1.53 | 0.79 |
| 29b | | | | 5.07 | 1.53 | 0.79 |

| | Part II (g) | | | | | |
|---|---|---|---|---|---|---|
| Example | CN983 (Aliphatic Polyester Urethane Diaacrylate) | CN965 (Aliphatic Polyester Urethane Diacrylate) | CN978 (90% Aromatic Polyester Urethane Diacrylate/ 10% 2(2-ethoxyethoxy) Ethyl Acrylate) | Methyl Ethyl Ketone | Ethanol | Catalyst (g) 21% Sodium Ethoxide in Ethanol |
| C14 | | | | 49.65 | | 0.23 |
| C14a | | | | 49.65 | | 0.23 |
| C14b | | | | 49.65 | | 0.23 |
| C15 | | | | 37.05 | | 0.21 |
| C15a | | | | 37.05 | | 0.21 |
| C15b | | | | 37.05 | | 0.21 |
| 16 | | | | | 3.75 | 0.14 |
| 16a | | | | | 3.75 | 0.14 |
| 16b | | | | | 3.75 | 0.14 |
| 17 | | | | | 5.12 | 0.18 |
| 17a | | | | | 5.12 | 0.18 |
| 17b | | | | | 5.12 | 0.18 |
| 18 | 0.79 | | | | 6.48 | 0.16 |
| 18a | 0.79 | | | | 6.48 | 0.16 |
| 18b | 0.79 | | | | 6.48 | 0.16 |
| 19 | | 0.87 | | | 6.45 | 0.18 |
| 19a | | 0.87 | | | 6.45 | 0.18 |
| 19b | | 0.87 | | | 6.45 | 0.18 |
| 20 | | | 0.82 | | 5.89 | 0.16 |
| 20a | | | 0.82 | | 5.89 | 0.16 |
| 20b | | | 0.82 | | 5.89 | 0.16 |
| 21 | | | | | 7.25 | 0.18 |
| 21a | | | | | 7.25 | 0.18 |
| 21b | | | | | 7.25 | 0.18 |
| 22 | | | | | 7.58 | 0.17 |
| 22a | | | | | 7.58 | 0.17 |
| 22b | | | | | 7.58 | 0.17 |
| 23 | | | | | 8.00 | 0.17 |
| 23a | | | | | 8.00 | 0.17 |
| 23b | | | | | 8.00 | 0.17 |

TABLE 5-continued

Materials Used in Application Testing of Composition Made by Reaction of Acetoacetate Terminated Polyester with Polyacrylate

| Example | | |
|---|---|---|
| 24 | 8.15 | 0.17 |
| 24a | 8.15 | 0.17 |
| 24b | 8.15 | 0.17 |
| 25 | 11.74 | 0.19 |
| 25a | 11.74 | 0.19 |
| 25b | 11.74 | 0.19 |
| 26 | 12.62 | 0.18 |
| 26a | 12.62 | 0.18 |
| 26b | 12.62 | 0.18 |
| 27 | 13.59 | 0.28 |
| 27a | 13.59 | 0.28 |
| 27b | 13.59 | 0.28 |
| 28 | 7.36 | 0.23 |
| 28a | 7.36 | 0.23 |
| 28b | 7.36 | 0.23 |
| 29 | 7.61 | 0.23 |
| 29a | 7.61 | 0.23 |
| 29b | 7.61 | 0.23 |

NOTE:
C14, C14a, C14b, C15, C15a, and C15b are comparative examples.
SR259 (diacrylate of polyethylene glycol 200) is made by Sartomer Company, Inc., located in Exton, PA.
MorCure 2000 (diacrylate of diglycidyl ether bisphenol-A) is made by Rohm and Haas, located in Philadelphia, PA.
CN983 (aliphatic polyester urethane diacrylate) is made by Sartomer Company, Inc., located in Exton, PA.
CN965 (aliphatic polyester urethane diacrylate) is made by Sartomer Company, Inc., located in Exton, PA.
CN978 (90% aromatic polyester urethane diacrylate/10% 2(2-ethoxyethoxy) ethyl acrylate) is made by Sartomer Company, Inc., located in Exton, PA.

TABLE 6

Results of Application Testing of Composition Made by Reaction of Acetoacetate Terminated Polyester with Polyacrylate

| | Laminate Coating Weight (lbs/rm) | | | Peel Strength (g/ln. in.) | |
|---|---|---|---|---|---|
| Example | Polypropylene/ Polypropylene | Polyester/ Nylon | Polyester/ High Slip Polyethylene | 1 Day | 7 Days |
| C14 | ND | | | 0 | 10 |
| C14a | | ND | | 0 | 0 |
| C14b | | | ND | 0 | 0 |
| C15 | ND | | | 0 | 10 |
| C15a | | ND | | 0 | 0 |
| C15b | | | ND | 0 | 0 |
| 16 | 3.368 | | | 40 | 50 |
| 16a | | 3.145 | | 60 | 75 |
| 16b | | | 3.445 | 70 | 90 |
| 17 | 2.584 | | | 30 | 40 |
| 17a | | 2.169 | | 40 | 45 |
| 17b | | | 2.699 | 100 ± 10 | 120 ± 10 |
| 18 | 1.630 | | | 40 ± 10 | 25 ± 5 |
| 18a | | 2.069 | | 50 ± 5 | 35 ± 5 |
| 18b | | | 1.392 | 140 ± 10 | 40 ± 10 |
| 19 | 1.561 | | | 50 | 40 ± 5 |
| 19a | | 2.261 | | 55 ± 5 | 40 ± 5 |
| 19b | | | 1.438 | 170 ± 10 | 150 ± 10 |
| 20 | 2.438 | | | 55 ± 5 | 60 ± 10 |
| 20a | | 2.815 | | 70 ± 5 | 60 ± 5 |
| 20b | | | 1.930 | 140 ± 10 | 150 ± 10 |
| 21 | 0.592 | | | 35 | 35 |
| 21a | | 1.361 | | 40 ± 5 | 50 |
| 21b | | | 0.930 | 125 ± 10 | 110 |
| 22 | 1.107 | | | 35 | 40 |
| 22a | | 0.869 | | 45 | 20 |
| 22b | | | 1.046 | 160 | 100 ± 10 |
| 23 | 1.115 | | | 20 | 20 |
| 23a | | 1.253 | | 40 ± 5 | 35 |
| 23b | | | 1.007 | 95 | 50 |
| 24 | 1.476 | | | 30 | 25 |
| 24a | | 1.369 | | 45 ± 5 | 35 |
| 24b | | | 1.400 | 105 ± 5 | 70 |
| 25 | 1.530 | | | 50 | 65 |
| 25a | | 1.607 | | 70 ± 5 | 55 |
| 25b | | | 1.377 | 250 ± 5 | 230 |
| 26 | 1.238 | | | 105 | 110 |
| 26a | | 1.730 | | 80 ± 5 | 75 |
| 26b | | | 1.707 | 305 | 290 |
| 27 | 2.615 | | | 400 | 350 |
| 27a | | 1.676 | | 90 ± 10 | 85 ± 5 |
| 27b | | | 0.761 | 370 ± 10 | 340 |
| 28 | 1.730 | | | 75 | 85 |
| 28a | | 0.992 | | 130 | 120 ± 10 |
| 28b | | | 0.492 | 330 | 310 ± 20 |
| 29 | 1.707 | | | 80 ± 5 | 110 ± 10 |
| 29a | | 1.569 | | 170 ± 20 | 180 ± 10 |
| 29b | | | 0.277 | 420 | 400 ± 10 |

NOTE: C14, C14a, C14b, C15, C15a, and C15b are comparative examples.

TABLE 7

Materials Used in Application Testing of Composition Made by Reaction of Acetoacetate Terminated Polyesteramide with Polyacrylate

| | Part I (g) | | | Part II (g) | | | Catalyst (g) |
|---|---|---|---|---|---|---|---|
| | | | | SR259 | MorCure 2000 | | |
| Example | Acetoacetate Terminated Polyesteramide 9 | Acetoacetate Terminated Polyesteramide 11 | Acetoacetate Terminated Polyesteramide 12 | (Diacrylate of Polyethylene Glycol 200) | (Diacrylate of Diglycidyl Ether Bisphenol-A) | Ethanol | 21% Sodium Ethoxide in Ethanol |
| 30 | 5.08 | | | 1.75 | | 6.79 | 0.19 |
| 30a | 5.08 | | | 1.75 | | 6.79 | 0.19 |
| 30b | 5.08 | | | 1.75 | | 6.79 | 0.19 |
| 31 | 5.21 | | | 1.45 | 0.75 | 7.49 | 0.19 |
| 31a | 5.21 | | | 1.45 | 0.75 | 7.49 | 0.19 |
| 31b | 5.21 | | | 1.45 | 0.75 | 7.49 | 0.19 |
| 32 | | 5.13 | | 2.11 | | 10.14 | 0.19 |
| 32a | | 5.13 | | 2.11 | | 10.14 | 0.19 |
| 32b | | 5.13 | | 2.11 | | 10.14 | 0.19 |
| 33 | | 5.14 | | 1.71 | 0.92 | 10.53 | 0.21 |
| 33a | | 5.14 | | 1.71 | 0.92 | 10.53 | 0.21 |
| 33b | | 5.14 | | 1.71 | 0.92 | 10.53 | 0.21 |
| 34 | | 5.10 | | 1.29 | 1.77 | 10.74 | 0.20 |
| 34a | | 5.10 | | 1.29 | 1.77 | 10.74 | 0.20 |
| 34b | | 5.10 | | 1.29 | 1.77 | 10.74 | 0.20 |
| 35 | | | 7.57 | 4.51 | | 12.60 | 0.32 |
| 35a | | | 7.57 | 4.51 | | 12.60 | 0.32 |
| 35b | | | 7.57 | 4.51 | | 12.60 | 0.32 |
| 36 | | | 7.53 | 3.80 | 1.88 | 13.50 | 0.33 |
| 36a | | | 7.53 | 3.80 | 1.88 | 13.50 | 0.33 |
| 36b | | | 7.53 | 3.80 | 1.88 | 13.50 | 0.33 |
| 37 | | | 7.57 | 2.99 | 3.87 | 14.59 | 0.34 |
| 37a | | | 7.57 | 2.99 | 3.87 | 14.59 | 0.34 |
| 37b | | | 7.57 | 2.99 | 3.87 | 14.59 | 0.34 |
| 38 | | | 5.06 | 2.12 | | 7.38 | 0.22 |
| 38a | | | 5.06 | 2.12 | | 7.38 | 0.22 |
| 38b | | | 5.06 | 2.12 | | 7.38 | 0.22 |
| 39 | | | 5.03 | 1.72 | 0.92 | 8.14 | 0.21 |
| 39a | | | 5.03 | 1.72 | 0.92 | 8.14 | 0.21 |
| 39b | | | 5.03 | 1.72 | 0.92 | 8.14 | 0.21 |

NOTE: SR259 (diacrylate of polyethylene glycol 200) is made by Sartomer Company, Inc., located in Exton, PA. MorCure 2000 (diacrylate of diglycidyl ether bisphenol-A) is made by Rohm and Haas, located in Philadelphia, PA.

TABLE 8

Results of Application Testing of Composition Made by Reaction of Acetoacetate Terminated Polyesteramide with Polyacrylate

| | Laminate Coating Weight (lbs/rm) | | | Peel Strength (g/ln. in.) | |
|---|---|---|---|---|---|
| Example | Polypropylene/ Polypropylene | Polyester/ Nylon | Polyester/ High Slip Polyethylene | 1 Day | 7 Days |
| 30 | 2.238 | | | 25 | 50 |
| 30a | | 2.222 | | 35 | 45 |
| 30b | | | 1.653 | 40 | 110 |
| 31 | 3.030 | | | 60 | 125 |
| 31a | | 2.784 | | 40 | 60 |
| 31b | | | 2.061 | 70 | 240 |
| 32 | 1.392 | | | 25 | 50 |
| 32a | | 1.353 | | 30 | 35 |
| 32b | | | 1.077 | 105 | 150 ± 10 |
| 33 | 0.884 | | | 30 | 60 ± 10 |
| 33a | | 1.407 | | 50 | 60 ± 5 |
| 33b | | | 1.054 | 115 ± 5 | 215 ± 5 |
| 34 | 1.730 | | | 45 ± 5 | 100 ± 10 |
| 34a | | 1.730 | | 65 | 90 ± 5 |
| 34b | | | 1.007 | 240 | 270 |
| 35 | 1.253 | | | 75 | 75 |
| 35a | | 1.407 | | 55 ± 5 | 50 |
| 35b | | | 0.800 | 240 ± 10 | 230 |
| 36 | 1.323 | | | 140 ± 10 | 210 |
| 36a | | 1.907 | | 70 ± 10 | 80 ± 10 |
| 36b | | | 1.223 | 350 | 390 |
| 37 | 1.553 | | | 150 | 180 |
| 37a | | 2.022 | | 370 | 150 |
| 37b | | | 1.576 | 400 ± 20 | 700 |
| 38 | 1.384 | | | 90 ± 5 | 90 ± 5 |
| 38a | | 0.661 | | 100 ± 10 | 80 ± 10 |
| 38b | | | 0.569 | 300 | 300 ± 10 |
| 39 | 1.769 | | | 85 ± 5 | 120 |
| 39a | | 0.984 | | 110 ± 10 | 120 ± 10 |
| 39b | | | 0.731 | 380 | 380 |

What is claimed is:

1. A method of bonding two or more substrates, comprising the steps of:

(a) applying a composition to a first substrate, the composition comprising an α,β-unsaturated multi-carboxylic acid ester and a compound (A) having a structural formula:

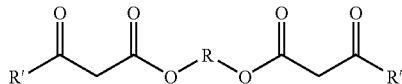

wherein R is a polyester or polyesteramide;
wherein R' is CH₃, CH₂CH₃, CH₂CH₂CH₃, or

wherein compound (A) is an acetoacetate terminated polyester or polyesteramide, having an acid value of 0.1 to 5, and containing from 5 to 80 mole percent of at least one aromatic multi-carboxylic acid, in the presence of at least one catalyst, selected from the group consisting of sodium alkoxides, potassium alkoxides, sodium acetylacetonates, and potassium acetylacetonates,
wherein said composition has a reactive equivalent functionality ratio of α,β-unsaturated multi-carboxylic acid ester to compound (A) of 0.67:1 to 1.75:1; and; (b) contacting at least one second substrate to the applied composition.

2. The method, as recited in claim 1, wherein the composition is applied to both surfaces of the first substrate and each surface of the first substrate is contacted to a second substrate, forming a multi-ply laminate.

3. The method, as recited in claim 2, wherein the composition is applied to a first surface of the first substrate and is contacted with a second substrate and the composition is applied to a second surface of the first substrate and is contacted with a third substrate, forming a multi-ply laminate.

4. The method, as recited in claim 1, wherein said composition has a reactive equivalent functionality ratio of α,β-unsaturated multi-carboxylic acid ester to compound (A) of 0.67:1 to 1.25:1.

5. The method, as recited in claim 1, wherein said composition has a reactive equivalent functionality ratio of α,β-unsaturated multi-carboxylic acid ester to compound (A) of 0.67:1 to 1.25:1.

6. The method, as recited in claim 1, wherein said α,β-unsaturated multi-carboxylic acid ester is a polyacrylate.

7. The method, as recited in claim 1, wherein said acetoacetate terminated polyester or polyesteramide contains 0 to 10 weight percent of urethane radicals.

8. The method, as recited in claim 1, wherein said acetoacetate terminated polyester or polyesteramide has a weight average molecular weight of 1,200 to 10,000.

9. The method, as recited in claim 1, wherein said acetoacetate terminated polyester or polyesteramide contains 1.6 to 3 acetoacetate groups per chain.

10. The method, as recited in claim 1, wherein said acetoacetate terminated polyester is produced by a process comprising the steps of:

(a) condensing glycols selected from the group consisting of diols, triols, and mixtures thereof, with carboxylic acids selected from the group consisting of dicarboxylic acids and tricarboxylic acids, to produce a polyester terminated with hydroxyl radicals, and having a hydroxyl value and an acid value, wherein said hydroxyl value exceeds said acid value; and (b) subsequently converting said hydroxyl radicals into acetoacetate radicals by reaction with a modifying reagent, to form said acetoacetate terminated polyester.

11. The method, as recited in claim 1, wherein said acetoacetate terminated polyesteramide is produced by a process comprising the steps of:

(a) condensing glycols selected from the group consisting of diols, triols, and mixtures thereof, and amino alcohol(s), with carboxylic acids selected from the group consisting of dicarboxylic acids and tricarboxylic acids, to produce a polyesteramide terminated with hydroxyl radicals, and having a hydroxyl value and an acid value, wherein said hydroxyl value exceeds said acid value; and (b) subsequently converting said hydroxyl radicals into acetoacetate radicals by reaction with a modifying reagent, to form said acetoacetate terminated polyesteramide.

12. The method, as recited in claim 1, wherein raid composition is substantially free of solvent.

13. The method, as recited in claim 1, wherein the composition is used to prepare multi-ply laminates.

14. A bonded multi-ply laminate comprising: (a) two or more plys comprising one or more substrates selected from the group consisting of: plastics, polyethylene, polypropylene, metallized plastics, metallized polypropylene, polyesters, polyamides, nylon, metals, aluminum and paper, and (b) a composition comprising a reaction product of an α,β-unsaturated multi-carboxylic acid ester and a compound (A) having the structural formula:

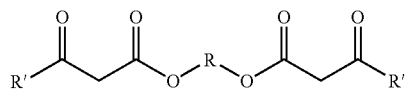

wherein R is a polyester or polyesteramide;
wherein R' is CH₃, CH₂CH₃, CH₂CH₂CH₃, or

wherein compound (A) is an acetoacetate terminated polyester or polyesteramide, having an acid value of 0.1 to 5, and containing from 5 to 80 mole percent of at least one aromatic multi-carboxylic acid, in the presence of at least one catalyst selected from the group consisting of sodium alkoxides, potassium alkoxides, sodium acetylacetonates, and potassium acetylacetonates, and the composition has a reactive equivalent functionality ratio of α,β-unsaturated multi-carboxylic acid ester to compound (A) of 0.67:1 to 1.75:1; wherein the composition bonds each substrate ply together.

* * * * *